United States Patent [19]

Stahl

[11] Patent Number: 5,632,345
[45] Date of Patent: *May 27, 1997

[54] ROTOTILLER SKIRT ASSEMBLY

[76] Inventor: Frank A. Stahl, 477 Howe Rd., Kent, Ohio 44240

[*] Notice: The term of this patent shall not extend beyond the expiration date of Pat. No. 5,415,234.

[21] Appl. No.: 639,443

[22] Filed: Apr. 29, 1996

[51] Int. Cl.$^6$ ............................................. A01B 33/00
[52] U.S. Cl. ........................... 172/112; 172/508; 172/517; 172/81
[58] Field of Search .................... 172/112, 508, 172/509, 512, 513, 517, 81; 171/112; 56/320.1, DIG. 24

[56] References Cited

U.S. PATENT DOCUMENTS

| | | |
|---|---|---|
| 2,959,231 | 11/1960 | Heilman . |
| 3,901,325 | 8/1975 | Richards . |
| 3,978,929 | 9/1976 | Clark . |
| 3,985,185 | 10/1976 | Pierce ............................. 172/81 |
| 3,985,186 | 10/1976 | Lee ................................ 172/81 |
| 4,592,428 | 6/1986 | Whitney ......................... 172/81 |
| 4,664,201 | 5/1987 | Pegoraro ........................ 172/112 |
| 4,979,573 | 12/1990 | Williamson ..................... 172/112 |
| 5,415,234 | 5/1995 | Stahl ............................. 172/112 |

*Primary Examiner*—Terry Lee Melius
*Assistant Examiner*—Christopher J. Novosad
*Attorney, Agent, or Firm*—Reese Taylor

[57] ABSTRACT

A free-floating skirt assembly for attachment to the deck of a cultivator to protect adjacent vegetation from the blades of the cultivator includes a pair of elongate straps attached to the cultivator deck with shield supports projecting outwardly from the straps and slidingly receiving shield suspension rods to which are attached the shields so that the shields may float as they encounter terrain irregularities. The range of sliding movement of the suspension rods is adjusted and controlled by the provision of through bores in the rods and replaceable pins inserted into the bores above the shield supports which include short shafts extending outwardly from each strap and T-shaped connectors which receive the shafts and the suspension rods. Braces depend from the straps to engage the cultivator deck in instances where the deck has a downwardly tapering rear portion.

7 Claims, 3 Drawing Sheets

ROTOTILLER SKIRT ASSEMBLY

FIELD OF THE INVENTION

This invention relates in general to rototillers or cultivators. More particularly, this invention relates to a skirt assembly attachable to the cultivator and comprising a pair of shields disposed outboard of the blades or tines to prevent plants from being covered with dirt or entangled with the blades during operation. Specifically, the invention relates to such a skirt assembly in which the shields are individually adjustable and free floating and in which the assembly can be attached as original manufacturing equipment or by retrofitting an existing cultivator.

BACKGROUND OF THE INVENTION

Rolotillers or cultivators have long been used to plow and cultivate gardens and the like. There are several different types of these cultivators. For instance, some have tines or soil-churning members located at the rear of the tiller behind the wheels and motor, as can be seen in Whitney U.S. Pat. No. 4,592,428, while others have them disposed near the front of the tiller below the motor.

Several rototillers are known to have accessories which shield the plants being cultivated from the blades, tines or soil-churning members. Many of these, however, are not capable of shielding plants on both sides of the apparatus. An example of such a device can be seen in Heilman U.S. Pat. No. 2,959,231. Clark U.S. Pat. No. 3,978,929 also shows such a cultivator with a wheeled attachment fitted on one side to lift vines and vegetative matter away from the blade.

Some cultivators, however, have been developed which do employ shields on both sides. However, these generally include an arrangement in which the shields are connected in some manner to the axle or shaft on which the blades or tines are mounted. Examples can be seen in Richards U.S. Pat. No. 3,901,325 and Lee U.S. Pat. No. 3,985,186. These devices permit the shields to pivot around the tine shaft, but such an arrangement may not be suitable for use at all times during the season, especially when the plants are quite small. Moreover, because the shields are connected to the tine shaft and the tines are limited as to the depth to which they may disrupt the soil, the vertical positioning of the shields is also fixed.

Pierce U.S. Pat. No. 3,985,185 does show a tiller which has shields on both sides and which employs a supporting device mounted on the frame of the tiller rather than the shaft of the tines. These shields are adjustable, but only to predetermined, fixed positions and are not free floating.

Applicant's earlier patent, Stahl U.S. Pat. No. 5,415,234, discloses an assembly designed to overcome the above-noted deficiencies of the prior art. That patent discloses shields mounted on both sides of the cultivator and also discloses that the shields are free floating and that the range or amount of movement of the shields in a vertical direction is adjustable.

While the prior art disclosed above, particularly that shown in Stahl U.S. Pat. No. 5,415,234, is believed to be suitable for the purposes for which it was designed, it is believed that still further improvements can be made.

For one thing, the decks of cultivators are often configured so that they extend horizontally from the front of the cultivator to a point near the rear and then taper downwardly so as to protect the operator. It has been found that the means of attaching the skirt assembly of the present invention to the deck can be improved by providing bracing to accommodate the change in planar configuration of the deck.

Furthermore, and inasmuch as the present invention is intended to be adapted to retrofitting as well as original production, it is believed advantageous to make the device more easily transportable and, therefore, the cross shafts of the Stahl invention, which extend entirely across the deck, may be modified to facilitate packaging and transportation.

Finally, while the free-floating arrangement of the Stahl prior art is certainly operative and effective, it does require threading of the suspension members which support the shields to accommodate an adjustment nut. The use of such a nut also requires the availability of a wrench in the field so that the operator may adjust during use.

Accordingly, it is believed possible to provide the effective free-floating arrangement of the shields disclosed in Applicant's earlier patent while improving the user-friendly nature thereof and reducing the cost.

SUMMARY OF THE INVENTION

It is, therefore, an object of the present invention to provide a skirt assembly for a cultivator which will permit cultivation at all times during the growing season and will provide free floating of the shields which protect the vegetation, so as to permit the cultivator to be operative on terrain of any contour.

It is also another object of the invention to produce an economical skirt assembly which is user friendly and which can be readily operated and adjusted by the cultivator operator in the field and which is also capable of ready packaging for compact shipping and storage.

Accordingly, it has been found that these objects can be achieved by providing a skirt assembly which includes a pair of straps which can be attached to the deck of the cultivator and braces associated with each strap for attachment to the rear of the deck.

It has also been found that these objects can be achieved by providing shield support members which comprise short, stub shafts extending outboard from the straps and which receive the suspension members which carry the shields and to enable the skirt assembly to be disassembled to a compact condition for shipping and storage.

It has also been found that the free-floating interconnection between the T-shaped connectors, which interconnect the stub shafts and the suspension members, can be facilitated by providing through bores in the suspension member and simply selectively positioning the suspension member vertically with respect to the T-shaped connector by removable pins.

Accordingly, production of a skirt assembly for a cultivator of the type above described becomes the principal object of this invention with other objects thereof becoming more apparent upon a reading of the following brief specification considered and interpreted in view of the accompanying drawings.

DESCRIPTION OF THE PREFERRED EMBODIMENTS

Figure 1:
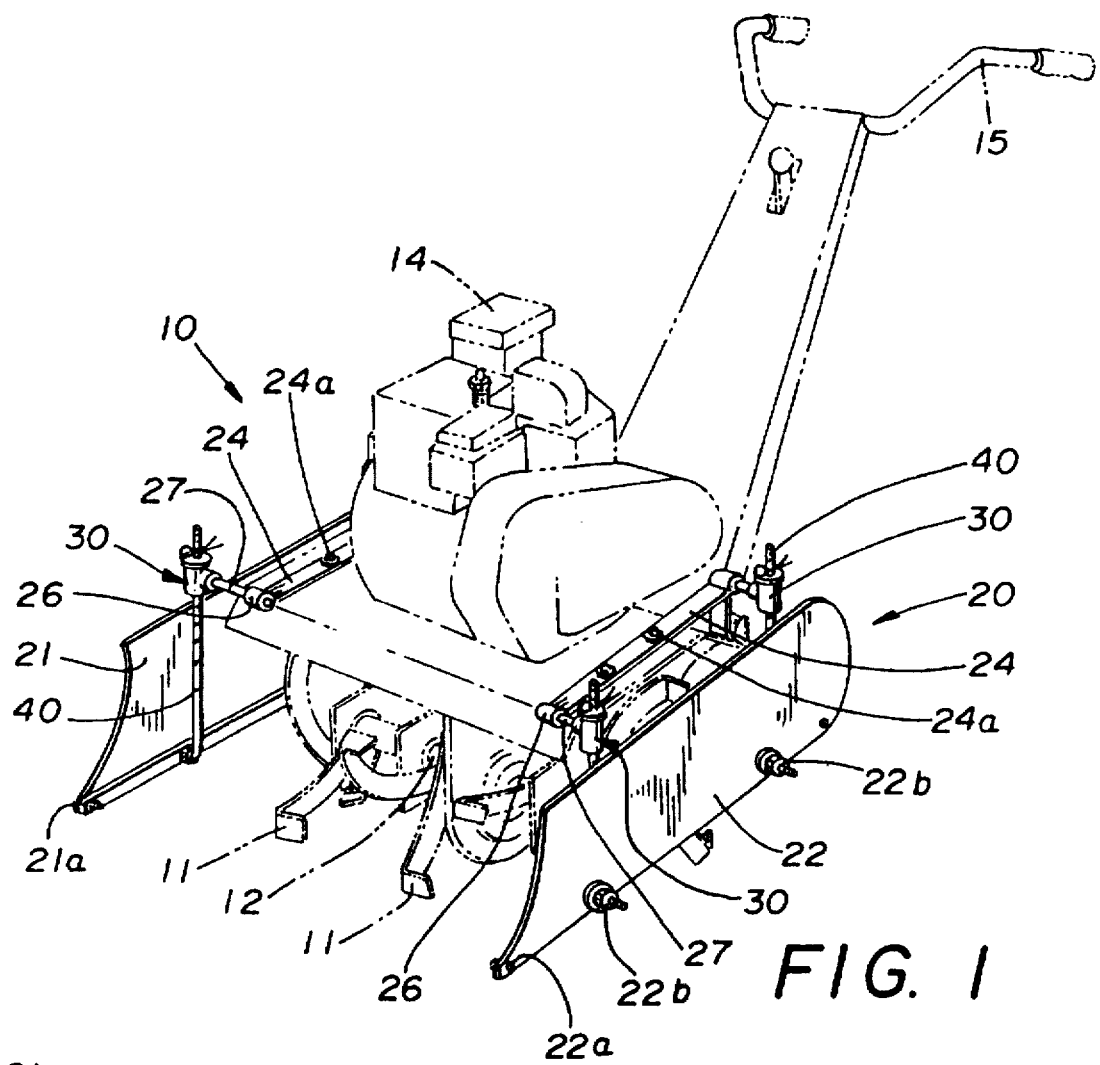
FIG. 1 is a perspective view of a skirt assembly of the present invention mounted on a cultivator.
Figure 2:
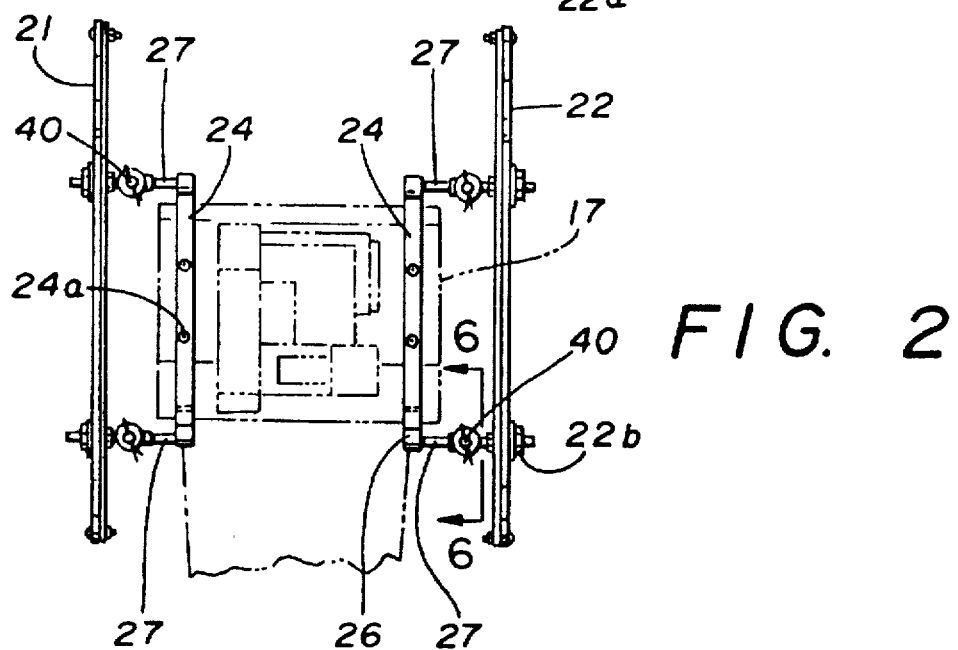
FIG. 2 is top plan view of the skirt assembly of FIG. 1.

A typical rototiller is generally indicated by the numeral 10 in FIG. 1 and includes the skirt assembly of this invention, generally indicated by the numeral 20. The cultivator 10 is of the conventional type having a plurality of tines 11,11 on a driven shaft 12 that extends outwardly from a bearing housing 12a positioned in front of the wheels 13 (see FIG. 3) and beneath the motor 14.

In addition, the cultivator 10 is equipped with a handle 15 extending from a frame 16 and a deck or guard panel 17 attached to frame 16 to deflect debris thrown up by the tines 11 from striking the operator and also to protect the operator against inadvertent contact with the moving parts.

Figures 5, 6:
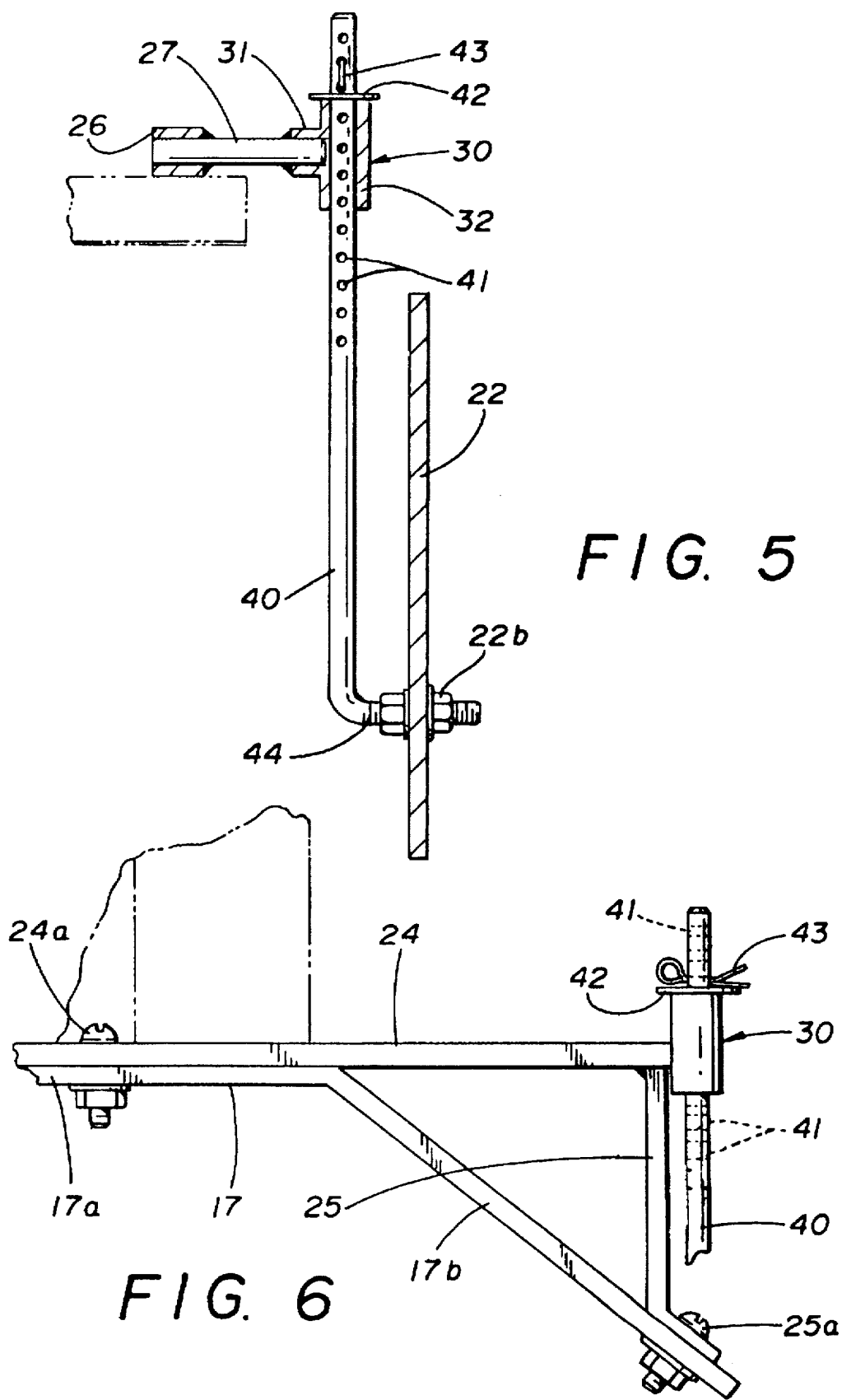
FIG. 5 is a sectional view taken along the line 5—5 of FIG. 4.
FIG. 6 is an enlarged sectional view taken along the line 6—6 of FIG. 2.

It will be noted from FIG. 6 of the drawings that the deck 17 has a generally horizontal front portion 17a and a rear portion 17b which tapers downwardly from the front portion and provides enhanced protection to the operator. The construction shown and described thus far is essentially conventional and, thus, has not been described in great detail herein.

Skirt assembly 20 includes a pair of opposed shields 21 and 22 which are disposed below the deck 17 and outboard thereof. They, of course, are also disposed outboard of the tines 11, as can be clearly seen in FIGS. 1 and 3 of the drawings. These shields may be made of any known material, such as wood, plastic, metal and the like, and are designed to shield the tines from any surrounding vegetation and vice versa. To that end, as can be seen in FIGS. 1 and 4 of the drawings, the shields are generally flat, sturdy, elongated pieces of material having arcuate front edges coming substantially to points at their forward or leading edges 21a,22a. The design of the leading edges facilitates the lifting of vegetation out of the way of the tines 11 as the soil is being cultivated and the cultivator is being moved forward.

Framework 23 connects the shields 21 and 22 to the deck 17. In that regard, the framework 23 includes a pair of strap members 24,24 which are elongate and substantially flat pieces of metal or similar material and which are secured to the deck by a nut and bolt arrangement indicated by the numerals 24a, 24a.

As can be seen in FIG. 6 of the drawings, and as described above, the deck 17, in many versions of cultivators, tapers downwardly, as at 17b, toward the rear of the cultivator. To ensure secure mounting of the skirt assembly to the deck, a brace member 25 is provided with each strap 24 and may be welded or otherwise secured to the lower surface thereof. This brace extends downwardly from the strap and can be bolted or otherwise secured to the rearward portion 17b of the deck, as at 25a, to further provide a firm and secure connection at the rear of the framework 23.

The straps 24,24 are, as noted, generally elongate, metallic strips which are slightly longer than the deck and are preferably bent at their forwardly disposed ends so as to form a bore or receptacle for ultimate support of the shields, as will be described.

To that end, each strap has associated with it short cross shafts 27,27 which are received in the bent ends of the straps and which project outwardly therefrom. These are generally relatively short, rod-like members which can be press-fit or otherwise secured to the ends of the straps.

T-shaped connectors 30 are provided for receipt of the projecting ends of the shafts 27,27. These T-shaped connectors each have a hollow leg 31 which receives and secures the projecting end of each shaft 27. This leg can be threaded, as shown in Applicant's earlier U.S. Pat. No. 5,415,234, to receive a threaded end of the shaft or the shaft end may be simply slid into the connector end and welded thereto, as shown in FIG. 5.

A second leg 32 of each T-shaped connector 30 is disposed in a vertical mode and receives the end of a suspension member 40, as can be seen in FIG. 6. Each suspension member 40 is generally elongate and has an L-shaped configuration when viewed in elevation. As noted, the upper end of each shaft 40 is slidingly received in the vertical leg 32 of the T-shaped connector 30. This upper end also has a series of through bores 41,41 for adjustment purposes. In that regard, it will be noted, particularly from FIG. 5 of the drawings, that a washer 42 and a pin 43 are provided with each suspension member 40. In order to adjust the degree to which the suspension member 40 projects from the T-shaped connector 30, it is simply necessary to remove the pin, slide the suspension member 40 either up or down, and replace the pin 43 in a selected hole 41. As noted, the suspension members 40 are freely, slidingly received within the T-shaped connectors and may move up and down. However, contact between the pin 43 and the washer 42 will limit the downward movement so that the height of the shields may effectively be preset and the range of movement controlled. It is also to be noted that this can be done essentially without any tools.

Figure 3:
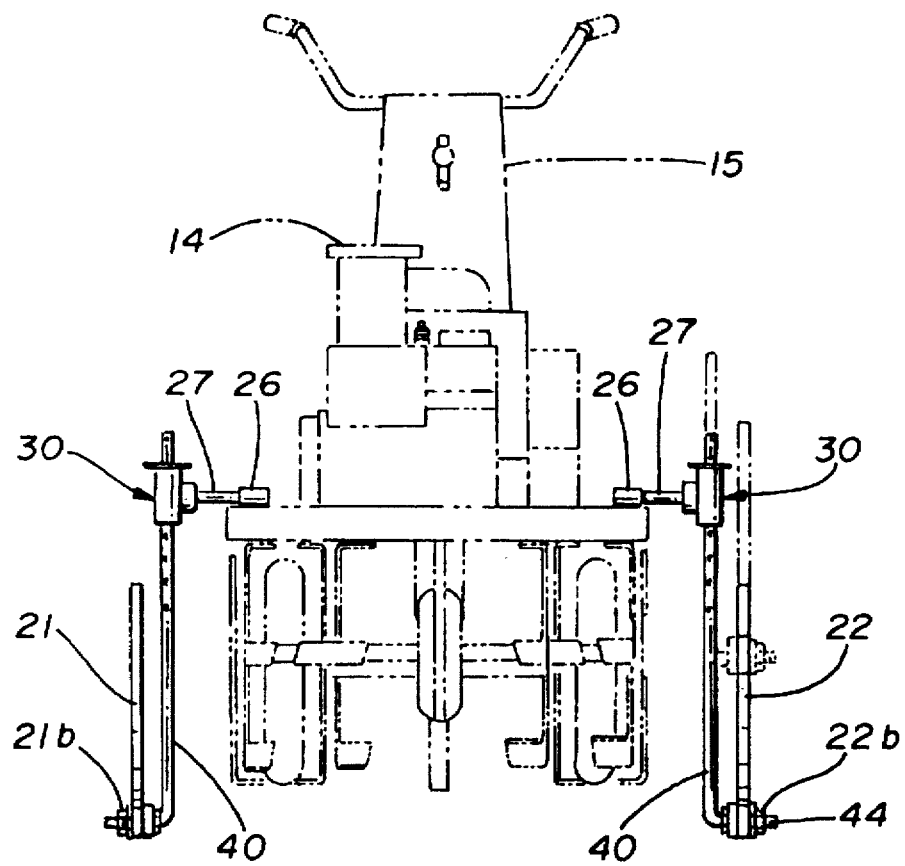
FIG. 3 is a front elevational view of the skirt assembly.
Figure 4:
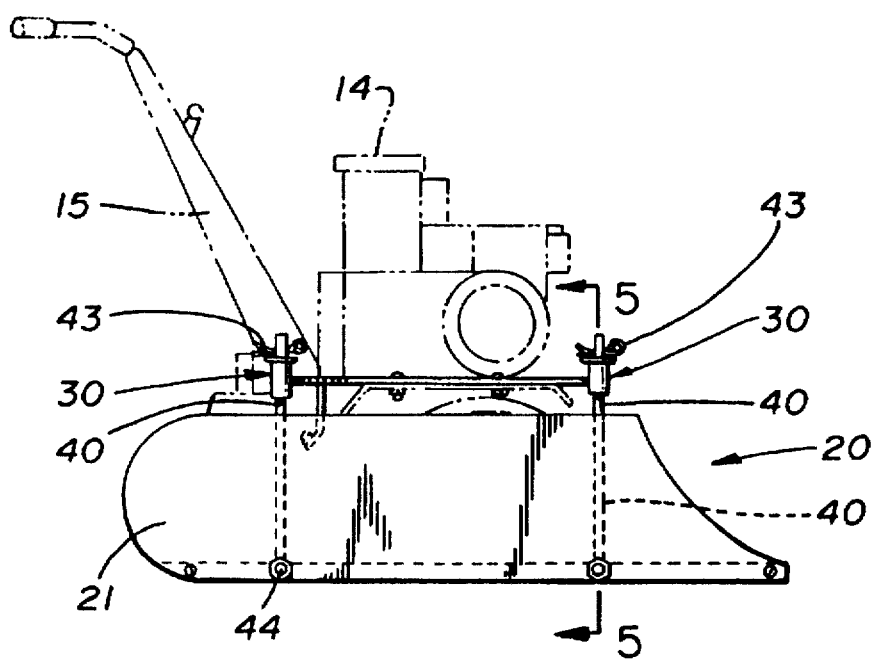
FIG. 4 is a side elevational view of the skirt assembly of FIG. 1 mounted on the deck of the cultivator of FIG. 1.

Still referring to FIGS. 3 and 5 of the drawings, it will now be noted that the suspension members 40 are L-shaped, as previously mentioned, and each of them has an outwardly projecting bottom end 44 which is threaded, as can be clearly seen in FIG. 5 of the drawings. A nut 22b secures the shields 21 and 22 to this end of each of the suspension members, thereby disposing the shields in the position shown in FIGS. 1 through 4 of the drawings.

Accordingly, as will be apparent, the skirt assembly 20 on the cultivator 10 will allow the operator to till the soil, and the floating nature of the connection between the suspension members 40 and the T-shaped connectors 30 permits the shields to float in response to varying terrain contours. This is controlled, however, by the selective placement pin 43 and washer 42 arrangement previously described.

It will be noted that, as mentioned earlier, the skirt assembly 20 of the present invention is intended to be utilized for retrofitting, as well as original equipment, and it is therefore believed desirable to be able to package the components in a compact manner. The utilization of the short stub shafts permits the disassembled skirt assembly to be very compactly stored for shipping and storage purposes.

While a full and complete description of the invention has been set forth in accordance with the dictates of the Patent Statutes, it should be understood that modifications could be resorted to without departing from the spirit hereof or the scope of the appended claims.

Thus, it is again noted that the cultivator illustrated in the drawings represents only a certain exemplary type and that any cultivator having a covering deck may be suitable for the use of the assembly described and claimed herein.

Furthermore, while some materials have been mentioned by way of illustration only, it will be apparent that the invention is not intended to be so limited and other materials having similar characteristics may be substituted therefor.

What is claimed is:

1. A skirt assembly for use with a cultivator, comprising:
    (a) a pair of shields spaced apart and disposed generally parallel to each other;

(b) a pair of strap members spaced apart and disposed generally parallel to each other;

(c) a plurality of shield support members operatively engaging said strap members and projecting therebeyond;

(d) a plurality of adjustable and free-floating suspension members connected to said shield support members and depending therefrom;

(e) said shields being fixed to said suspension members
   (1) whereby said shields and said suspension members may move relatively of said strap members; and (f) means carried by each said suspension member to control the movement of said suspension members relatively of said strap members.

2. The skirt assembly of claim 1 wherein said shield support members comprise shafts attached to said strap members and projecting outwardly therefrom.

3. The skirt assembly of claim 2 wherein T-shaped connectors interconnect said shafts to said suspension members, each said T-shaped connector being capable of securely receiving one of said shafts and slidably receiving one end of each of said suspension members.

4. The skirt assembly of claim 3 wherein each said T-shaped connector has a horizontal leg to receive each said shaft and a normally vertically disposed leg to receive each said suspension member.

5. The skirt assembly of claim 1 wherein said means for controlling the movement of said suspension members and said shields includes a plurality of through bores in said suspension members and a removable pin selectively receivable in said bores.

6. The skirt assembly of claim 1 wherein the cultivator includes a deck extending from the front of the cultivator in a generally horizontal plane for a distance and then tapering downwardly toward the rear of the cultivator; the skirt assembly including a pair of braces interconnecting said strap members and the downwardly tapering portion of the deck.

7. The skirt assembly of any one of the preceding claims wherein said shields include means to lift plants and vegetation away from the cultivator; said means including tapered forward edges.

* * * * *

UNITED STATES PATENT AND TRADEMARK OFFICE
CERTIFICATE OF CORRECTION

PATENT NO. : 5,632,345
DATED : May 27, 1997
INVENTOR(S) : Frank A. Stahl

It is certified that error appears in the above-identified patent and that said Letters Patent is hereby corrected as shown below:

In Column 4, line 65, delete "skin" and substitute therefor ---skirt---.

Signed and Sealed this

Twenty-ninth Day of July, 1997

Attest:

BRUCE LEHMAN

Attesting Officer

Commissioner of Patents and Trademarks